United States Patent
Rodne et al.

(10) Patent No.: US 12,521,401 B2
(45) Date of Patent: Jan. 13, 2026

(54) COMPOSITIONS COMPRISING FLUMAZENIL AND NALTREXONE AND METHODS FOR USE THEREOF

(71) Applicant: TREXAPHARM PTY LTD, Brisbane (AU)

(72) Inventors: Lee Eric Rodne, Eaton Hill (AU); Daniel John Zanardo, Ashgrove (AU); Julian Chick, Northcote (AU)

(73) Assignee: TREXAPHARM PTY LTD, Brisbane (AU)

( * ) Notice: Subject to any disclaimer, the term of this patent is extended or adjusted under 35 U.S.C. 154(b) by 323 days.

(21) Appl. No.: 18/039,150

(22) PCT Filed: Nov. 26, 2021

(86) PCT No.: PCT/AU2021/051413
§ 371 (c)(1),
(2) Date: May 26, 2023

(87) PCT Pub. No.: WO2022/109677
PCT Pub. Date: Jun. 2, 2022

(65) Prior Publication Data
US 2024/0000796 A1    Jan. 4, 2024

(30) Foreign Application Priority Data
Nov. 27, 2020 (AU) ................ 2020904390

(51) Int. Cl.
| | | |
|---|---|---|
| *A61K 31/5517* | (2006.01) | |
| *A61K 9/00* | (2006.01) | |
| *A61K 31/485* | (2006.01) | |
| *A61K 47/02* | (2006.01) | |
| *A61P 25/22* | (2006.01) | |
| *A61P 25/24* | (2006.01) | |

(52) U.S. Cl.
CPC ........ *A61K 31/5517* (2013.01); *A61K 9/0019* (2013.01); *A61K 9/0043* (2013.01); *A61K 31/485* (2013.01); *A61K 47/02* (2013.01); *A61P 25/24* (2018.01)

(58) Field of Classification Search
CPC ... A61K 31/5517; A61K 31/485; A61P 25/22; A61P 25/24
See application file for complete search history.

(56) References Cited

U.S. PATENT DOCUMENTS

| | | |
|---|---|---|
| 2009/0318426 A1 | 12/2009 | Ibanez |
| 2012/0122851 A1 | 5/2012 | O'Neil |
| 2015/0202199 A1 | 7/2015 | Bear et al. |
| 2016/0256472 A1 | 9/2016 | O'Neil |

FOREIGN PATENT DOCUMENTS

| | | |
|---|---|---|
| WO | 2006/110557 | 10/2006 |
| WO | 2007/064586 | 6/2007 |
| WO | WO 2020/181340 | 9/2020 |

OTHER PUBLICATIONS

Kapczinski, F. et al., "Flumazenil has an anxiolytic effect in simulated stress", Psychopharmacology, vol. 114, pp. 187-189, (1994).
ACTRN 12621000310864, "Microdose antagonist combination for depression (MAC-D) trial: combination of low dose naltrexone and flumazenil for treatment of major depressive disorder", Australia and New Zealand Trials Registry, pp. 1-4, (2021).
International Search Report dated Feb. 11, 2022 for PCT application No. PCT/AU2021/051413, 4 pages.
International Preliminary Report on Patentability dated Aug. 10, 2022 for PCT application No. PCT/AU2021/051413, 5 pages.

*Primary Examiner* — Bruck Kifle
(74) *Attorney, Agent, or Firm* — EVAN LAW GROUP LLC

(57) ABSTRACT

The present invention relates to pharmaceutical compositions comprising flumazenil and naltrexone, especially compositions comprising low-dose flumazenil and low-dose naltrexone. The present invention also relates to methods for the use of a combination of flumazenil and naltrexone in the treatment of depression and/or anxiety and/or post-traumatic stress disorder (PTSD).

15 Claims, No Drawings

COMPOSITIONS COMPRISING FLUMAZENIL AND NALTREXONE AND METHODS FOR USE THEREOF

FIELD

The present invention relates to pharmaceutical compositions comprising flumazenil and naltrexone, especially compositions comprising low-dose flumazenil and low-dose naltrexone. The present invention also relates to methods for the use of a combination of flumazenil and naltrexone in the treatment of depression and/or anxiety and/or post-traumatic stress disorder (PTSD). The present invention further relates to kits comprising the one or more of the pharmaceutical compositions.

BACKGROUND

Flumazenil and naltrexone are marketed drugs. Flumazenil is a GABA antagonist and is commercially used to reverse the effects of benzodiazepine sedation, where it is typically administered intravenously. Naltrexone is an opioid receptor antagonist and is commercially used in high doses for the management of opioid or alcohol dependence. When used in high doses, it typically administered orally, by intramuscular injection or by subcutaneous implant. Naltrexone has also been used "off-label" in low doses for conditions not related to dependence.

Depression is a condition that affects physical and mental health and is a leading cause of death and disability worldwide and post-traumatic stress disorder (PTSD) is a comorbidity with depression. Anxiety is also a common mental illness worldwide. There are currently treatments available for depression, PTSD and anxiety including behavioural and drug therapies. However, there are limitations that prevent the uptake of treatment including lack of education, social stigma, limited treatment options, and unaffordability, leading to an unmet need for treatment. Regarding current drug therapies, factors such as adverse side effects, contraindications, intolerances, the need for multiple drugs and the inconvenience of taking or administering the drug(s) may also lead to poor patient compliance. Further, some patients have been found to be unresponsive to current drug therapies.

Accordingly, there is a need for alternative therapies that can be used for the treatment of depression, anxiety and post-traumatic stress disorder that may address one or more of the limitations associated with current treatments.

SUMMARY

The present invention is predicated at least in part on the discovery that the combination of microdose flumazenil and microdose naltrexone may be useful in the treatment of conditions such as depression, anxiety and PTSD.

In one aspect of the present invention, there is provided a pharmaceutical composition comprising flumazenil and naltrexone, or pharmaceutically acceptable salts thereof, wherein the flumazenil and naltrexone are present in a ratio of from about 300:1 to about 2:1 by weight.

In another aspect of the present invention, there is provided a method for treating depression comprising administering to a patient in need thereof a combination of flumazenil and naltrexone, or pharmaceutically acceptable salts thereof, wherein the flumazenil and naltrexone are administered in a ratio of from about 300:1 to about 2:1 by weight.

In a further aspect of the present invention, there is provided a method for treating anxiety comprising administering to a patient in need thereof a combination of flumazenil and naltrexone, or pharmaceutically acceptable salts thereof, wherein the flumazenil and naltrexone are administered in a ratio of from about 300:1 to about 2:1 by weight.

In a further aspect of the present invention, there is provided a method for treating post-traumatic stress disorder comprising administering to a patient in need thereof a combination of flumazenil and naltrexone, or pharmaceutically acceptable salts thereof, wherein the flumazenil and naltrexone are administered in a ratio of from about 300:1 to about 2:1 by weight.

In yet a further aspect of the present invention, there is provided a kit comprising one or more of the pharmaceutical compositions described herein and optionally a delivery device.

DETAILED DESCRIPTION

1. Definitions

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

The articles "a" and "an" are used herein to refer to one or to more than one (i.e. to at least one) of the grammatical object of the article. By way of example, "an element" means one element or more than one element.

As used herein, the term "about" refers to a quantity, value, dimension, size, or amount that varies by as much as 30%, 25%, 20%, 15% or 10% to a reference quantity, value, dimension, size, or amount.

As used herein, unless the context requires otherwise, the word "comprise", and variations such as "comprises" and "comprising", will be understood to imply the inclusion of a stated integer or step or group of integers or steps but not the exclusion of any other integer or step or group of integers or steps.

2. Pharmaceutical Composition

The present invention provides a pharmaceutical composition comprising flumazenil and naltrexone or their pharmaceutically acceptable salts.

The composition comprises flumazenil in a particular amount relative to naltrexone by weight. The present inventors have arrived at specific ratios and amounts of flumazenil and naltrexone based on observations made on a number of previous studies and taking into consideration the relative bioavailabilities of flumazenil and naltrexone via different routes of administration.

In some embodiments, the flumazenil and naltrexone are present in the composition in a ratio ranging from about 300:1 to about 2:1 by weight of flumazenil to naltrexone. In some embodiments, the flumazenil and naltrexone are present in a ratio of about 300:1, 280:1, 260:1, 250:1, 240:1, 220:1, 200:1, 180:1, 160:1, 150:1, 140:1, 120:1, 100:1, 90:1, 80:1, 70:1, 60:1, 50:1, 45:1, 40:1, 35:1, 30:1, 28:1, 26:1, 25:1, 24:1, 22:1, 19:1, 18:1, 17:1, 16:1, 15:1, 14:1, 13:1, 25:2, 12:1, 11:1, 10:1, 9:1, 8:1, 7:1, 6:1, 5:1, 4:1, 3:1, or 2:1 by weight of flumazenil to naltrexone. Any ratio of flumazenil and naltrexone can be combined to form a range provided that the range is within 300:1 and 2:1, such a range of about 30:1 to about 4:1, or about 25:1 to about 10:1.

In some embodiments, the composition is in the form of a single dosage unit, which may be administered to a patient during treatment. The amount of flumazenil and naltrexone included in the composition or single dosage unit may be suitably selected depending on the treatment regimen. In some embodiments, the single dosage unit formulated for administration over a period of time ranging from about 1 day to about 10 days. In some embodiments, the single dosage unit is formulated for administration over about 1 day, 2 days, 3 days, 4 days, 5 days, 6 days, 7 days, 8 days, 9 days, or 10 days, especially about 4 days.

In some embodiments, the single dosage unit (or the composition) comprises flumazenil in an amount to provide a daily dose ranging from about 250 to about 7,500 micrograms. In some embodiments, the single dosage unit comprises flumazenil in an amount to provide a daily dose of about 250; 500; 750; 1,000; 1,250; 1,500; 1,750; 2,000; 2,250; 2,500; 2,750; 3,000; 3,250; 3,500; 3,750; 4,000; 4,250; 4,500; 4,750; 5,000; 5,250; 5,750; 6,000; 6,250; 6,500; 6,750; 7,000; 7,250; or 7,500 micrograms. Any minimum and maximum can be combined to form a range provided that the range is within 250 to 7,500 micrograms, such as a range of about 2,000 to about 5,000 micrograms, or about 2,500 to about 4,500 micrograms.

In some embodiments, the single dosage unit (or the composition) comprises naltrexone in an amount to provide a daily dose ranging from about 25 to about 1,000 micrograms. In some embodiments, the single dosage unit comprises naltrexone in an amount to provide a daily dose of about 25; 50; 75; 100; 125; 150; 175; 200; 225; 250; 275; 300; 325; 350; 375; 400; 425; 450; 475; 500; 550; 600; 650; 700; 750; 800; 850; 900; 950; or 1,000 micrograms. Any minimum and maximum can be combined to form a range provided that the range is within 25 to 1,000 micrograms, such as a range of about 100 to about 600 micrograms, or about 200 to about 400 micrograms.

In some embodiments, the flumazenil is present in the single dosage unit (or the composition) in an amount ranging from about 1,000 to about 30,000 micrograms. In some embodiments, the flumazenil is present in an amount of about 1,000; 2,000; 3,000; 4,000; 5,000; 6,000; 7,000; 8,000; 9,000; 10,000; 11,000; 12,000; 13,000; 14,000; 15,000; 16,000; 17,000; 18,000; 19,000; 20,000; 21,000; 22,000; 23,000; 24,000; 25,000; 26,000; 27,000; 28,000; 29,000; or 30,000 micrograms. Any minimum and maximum amount can be combined to form a range provided that the range is within 1,000 to 30,000 micrograms, such as a range of about 8,000 to about 20,000 micrograms, or about 10,000 to about 18,000 micrograms.

In some embodiments, the naltrexone is present in the single dosage unit (or the composition) in an amount ranging from about 100 to about 4,000 micrograms. In some embodiments, the naltrexone is present in an amount of about 100; 200; 300; 400; 500; 600; 700; 800; 900; 1000; 1,100; 1,200; 1,300; 1,400; 1,500; 1,600; 1,700; 1,800; 1,900; 2,000; 2,200; 2,400; 2,600; 2,800; 3,000; 3,200; 3,400; 3,600; 3,800; or 4,000 micrograms. Any minimum and maximum can be combined to form a range provided that the range is within 100 to 4,000 micrograms, such as a range of about 400 to about 2,400 micrograms, or about 800 to about 1,600 micrograms.

The pharmaceutical composition may be suitably formulated for administration by a particular route. Suitable routes of administration include oral, transmucosal, transdermal, and parenteral administration. In some embodiments, the composition is formulated for oral administration, topical administration such as buccal or sublingual administration, nasal administration, transdermal administration, or parenteral administration such as subcutaneous or intramuscular administration. In particular embodiments, the composition is formulated for parenteral administration, especially subcutaneous administration. In other particular embodiments, the composition is formulated for nasal administration. The ratio and amounts of flumazenil and naltrexone in the composition may be suitably selected based on the relative bioavailabilities of the respective compounds for the particular route of administration.

In some embodiments, the pharmaceutical composition comprises a pharmaceutically acceptable carrier or excipient. The excipient(s) must be "acceptable" in the sense of being compatible with other ingredients of the composition and not deleterious to the recipient thereof. Suitable excipients include disodium edetate and sodium chloride.

Pharmaceutical formulations include those suitable for oral, topical (including buccal and sub-lingual), nasal or parenteral (including subcutaneous, intramuscular and intravenous) administration or in a form suitable for administration by inhalation or insufflation. The combination of the invention, together with a conventional adjuvant, carrier, excipient, or diluent, may thus be placed into the form of pharmaceutical compositions and unit dosages thereof, and in such form may be employed as solids, such as tablets or filled capsules, or liquids such as solutions, suspensions, emulsions, elixirs, or capsules filled with the same, all for oral use, in the form of aqueous suspensions for use in nasal spray formulations or in the form of sterile injectable solutions for parenteral (including subcutaneous) use. Such compositions and unit dosage forms thereof may comprise conventional ingredients in conventional proportions, with or without additional active compounds or principles, and such unit dosage forms may contain any suitable effective amount of the combination commensurate with the intended daily dosage range to be employed as described herein. The compounds of the present invention can be administered in a wide variety of oral and parenteral dosage forms. It will be understood by those skilled in the art that the following dosage forms may comprise flumazenil and naltrexone, or pharmaceutically acceptable salts thereof.

For preparing pharmaceutical compositions of the present invention, pharmaceutically acceptable carriers can be either solid or liquid. Solid form preparations include powders, tablets, pills, capsules, cachets, suppositories, and dispersible granules. A solid carrier can be one or more substances which may also act as diluents, flavouring agents, solubilisers, lubricants, suspending agents, binders, preservatives, tablet disintegrating agents, or an encapsulating material.

In powders, the carrier is a finely divided solid which is in a mixture with the finely divided active component.

In tablets, the active component is mixed with the carrier having the necessary binding capacity in suitable proportions and compacted in the shape and size desired.

The powders and tablets preferably contain from 5 or 10 to about 70 percent of the active compound. Suitable carriers are magnesium carbonate, magnesium stearate, talc, sugar, lactose, pectin, dextrin, starch, gelatin, tragacanth, methylcellulose, sodium carboxymethylcellulose, a low melting wax, cocoa butter, and the like. The term "composition" is intended to include the formulation of the flumazenil and naltrexone with encapsulating material as carrier providing a capsule in which the flumazenil and naltrexone, with or without carriers, are surrounded by a carrier, which is thus in association with the flumazenil and naltrexone. Similarly, cachets and lozenges are included. Tablets, powders, capsules, cachets, and lozenges can be used as solid forms suitable for oral administration.

Liquid form preparations include solutions, suspensions, and emulsions, for example, water or water-propylene glycol solutions. For example, parenteral injection liquid preparations can be formulated as solutions in aqueous polyethylene glycol solution. In another example, nasal sprays may be formulated as solutions or suspensions in water. In embodiments where the formulation is a liquid, the liquid preferably has a pH of about 4.6 or above, especially a pH of about 4.6 to 4.8, more especially a pH of about 4.7.

Accordingly, the flumazenil and naltrexone may be formulated for parenteral administration (e.g. by injection, for example bolus injection or continuous infusion) and may be presented in unit dose form in ampoules, pre-filled syringes, small volume infusion or in multi-dose containers with an added preservative. The compositions may take such forms as suspensions, solutions, or emulsions in oily or aqueous vehicles, and may contain formulatory agents such as suspending, stabilising and/or dispersing agents. Alternatively, the flumazenil and naltrexone may be in powder form, obtained by aseptic isolation of sterile solid or by lyophilisation from solution, for constitution with a suitable vehicle, e.g. sterile, pyrogen-free water, before use.

Aqueous solutions suitable for oral use can be prepared by dissolving the flumazenil and naltrexone in water and adding suitable colorants, flavours, stabilising and thickening agents, as desired.

Aqueous suspensions suitable for oral use can be made by dispersing finely divided flumazenil and naltrexone in water with viscous material, such as natural or synthetic gums, resins, methylcellulose, sodium carboxymethylcellulose or a salt thereof, or other well-known suspending agents.

Also included are solid form preparations which are intended to be converted, shortly before use, to liquid form preparations for oral administration. Such liquid forms include solutions, suspensions, and emulsions. These preparations may contain, in addition to the active component, colorants, flavours, stabilisers, buffers, artificial and natural sweeteners, dispersants, thickeners, solubilizing agents, and the like.

Solutions or suspensions are applied directly to the nasal cavity by conventional means, for example with a dropper, pipette or spray. The formulations may be provided in single or multidose form. In the latter case of a dropper or pipette, this may be achieved by the patient administering an appropriate, predetermined volume of the solution or suspension. In the case of a spray, this may be achieved for example by means of a metering atomizing spray pump. To improve nasal delivery and retention, the flumazenil and naltrexone may be encapsulated with cyclodextrins or formulated with agents expected to enhance delivery and retention in the nasal mucosa. The nasal formulation may also include a preservative such as benzalkonium chloride and the like.

Administration to the respiratory tract may also be achieved by means of an aerosol formulation in which the flumazenil and naltrexone is provided in a pressurised pack with a suitable propellant such as a hydrofluoroalkane (HFA) or chlorofluorocarbon (CFC) for example, dichlorodifluoromethane, trichlorofluoromethane, or dichlorotetrafluoroethane, carbon dioxide, or other suitable gas. The aerosol may conveniently also contain a surfactant such as lecithin. The dose of drug may be controlled by provision of a metered valve.

Alternatively, the flumazenil and naltrexone may be provided in the form of a dry powder, for example a powder mix of the compound in a suitable powder base such as lactose, starch, starch derivatives such as hydroxypropylmethyl cellulose and polyvinylpyrrolidone (PVP).

Conveniently, the powder carrier will form a gel in the nasal cavity. The powder composition may be presented in unit dose form for example in capsules or cartridges of, e.g., gelatin, or blister packs from which the powder may be administered by means of an inhaler.

In formulations intended for administration to the respiratory tract, including intranasal formulations, the compound will generally have a small particle size for example of the order of 1 to 50 microns or less. Such a particle size may be obtained by means known in the art, for example by micronisation.

When desired, formulations adapted to give sustained release of the active ingredient may be employed.

In embodiments where the pharmaceutical composition is in the form of a single dosage unit, the unit dosage form can be a packaged composition, the package containing discrete quantities of composition, such as packeted tablets, capsules, and powders in vials or ampoules. Also, the unit dosage form can be a capsule, tablet, cachet, or lozenge itself, or it can be the appropriate number of any of these in packaged form.

In some embodiments, the pharmaceutical composition (or single dosage unit) is contained in a delivery device. Suitable delivery devices for nasal administration include nasal sprays. Suitable delivery devices for transdermal administration include transdermal patches and implants. Suitable delivery devices for parenteral administration such as subcutaneous administration include infusion pumps such as ambulatory infusion pumps.

The pharmaceutical composition may be suitably formulated to allow for immediate release, delayed release or slow release of the flumazenil and naltrexone.

The pharmaceutical composition described herein may be included in a pharmaceutical product or kit. The kit may comprise one or more pharmaceutical compositions of the invention, where each composition may be in the form of a single dosage unit as described herein. The single dosage unit(s) may be in any suitable form as described herein. The kit may optionally comprise a device for delivery of the pharmaceutical composition or single dosage unit.

Accordingly, in an aspect of the present invention, there is provided a kit comprising one or more of the pharmaceutical compositions described herein and optionally a delivery device. The delivery device may be any suitable delivery device as described herein. The delivery device may be suitably adapted to deliver a single dosage unit over a period of time. The delivery device may also be suitably adapted to allow for the exchange or replacement of single dosage units.

In a particular embodiment, the kit comprises one or more parenteral dosage units suitable for subcutaneous delivery over one or more days, such as over about 2 days, 3 days or 4 days, together with a syringe pump suitable to deliver the dosage unit over the given period of time. In some embodiments, replacement dosages may be included in the kit to provide multiple dosage units to be delivered sequentially, for example over about 2 days, 3 days, 4 days, 6 days, 7 days, 8 days, 9 days, 10 days, 11 days, 12 days, 13 days, 14 days, 15 days or 16 days, or for any time between these delivery times.

3. Methods of Use

The combination of flumazenil and naltrexone may be useful in the treatment of depression. Accordingly, the present invention provides a method for treating depression comprising administering to a patient in need thereof a combination of flumazenil and naltrexone, or pharmaceutically acceptable salts thereof, wherein the flumazenil and naltrexone are administered in a ratio of from about 300:1 to about 2:1 by weight.

The expression "treating depression" in this context refers to an improvement in symptoms associated with depression, where the improvement may be characterised qualitatively or quantitatively by assessments known in the art. The depression may be treatment resistant depression where the patient has previously been unresponsive to anti-depressant medication. Examples of types of depression or major depressive disorder include: depression with melancholic features or somatic syndrome, depression with psychotic features, depression with atypical features, depression with catatonic features, depression with anxious distress and depression with mixed features. Episodes of depression of any type may have an illness pattern such as single, recurrent, seasonal or persistent, and/or related to organic causation (such as medication-induced or caused by behavioural and psychological symptoms of dementia (BPSD)) or neuroendocrine disruption such as in pre-menstrual dysphoric disorder, peri-menopausal or perinatal (including antenatal and post-natal) depression.

The combination of flumazenil and naltrexone may also be useful in the treatment of anxiety. Accordingly, the present invention provides a method for treating anxiety comprising administering to a patient in need thereof a combination of flumazenil and naltrexone, or pharmaceutically acceptable salts thereof, wherein the flumazenil and naltrexone are administered in a ratio of from about 300:1 to about 2:1 by weight.

The expression "treating anxiety" in this context refers to an improvement in anxiety symptoms, where the improvement may be characterised qualitatively or quantitatively by assessments known in the art. Examples of types of anxiety include generalised anxiety disorder, social anxiety disorder, panic disorder, specific phobias, and post-traumatic stress disorder. In the context of the present invention, the combination of flumazenil and naltrexone may be useful for the treatment of anxiety generally and not necessarily (but not excluding) anxiety linked to craving for smoking, alcohol or drug use. Accordingly, in specific embodiments, the anxiety is not associated with craving such as smoking craving or dependency.

The combination of flumazenil and naltrexone may be useful in the treatment of PTSD. Accordingly, the present invention provides a method for treating PTSD comprising administering to a patient in need thereof a combination of flumazenil and naltrexone, or pharmaceutically acceptable salts thereof, wherein the flumazenil and naltrexone are administered in a ratio of from about 300:1 to about 2:1 by weight.

The treatment may also reduce the symptoms of depression, anxiety and/or PTSD. For example, the treatment may allow that patient to perform daily tasks, such as showering, cleaning, shopping and planning for future events that had not been possible before treatment. Improvements in mood, libido, concentration may also occur on treatment.

The term "combination" as used herein refers to the flumazenil and naltrexone being administered in a single composition, or separately, either simultaneously or sequentially. The flumazenil and naltrexone may be administered at different times and different frequencies, but in combination they exert biological effects at the same time or at overlapping times.

In some embodiments, the combination may be administered to a patient that has previously been unresponsive to anti-depressant or anti-anxiety therapies.

The patient to be treated may already be receiving therapy for depression, anxiety or PTSD, or one or more other existing conditions. Accordingly, the combination of flumazenil and naltrexone may be administered in combination with other therapies. In some embodiments, the patient is currently receiving therapy for depression or anxiety. In these embodiments, the combination of flumazenil and naltrexone may be additional or a replacement to the current anti-depressant therapy or anti-anxiety therapy and related therapies such as psychotherapy. It may also be used in combination with or antedating neurostimulation treatments such as transcranial magnetic stimulation (TMS), electroconvulsive therapy (ECT) and transcranial direct-current stimulation (tDCS).

The combination comprises a therapeutically effective amount of flumazenil and naltrexone. In some embodiments, the flumazenil and naltrexone are administered in a ratio ranging from about 300:1 to about 2:1 by weight of flumazenil to naltrexone. In some embodiments, the flumazenil and naltrexone are administered in a ratio of about 300:1, 280:1, 260:1, 250:1, 240:1, 220:1, 200:1, 180:1, 160:1, 150:1, 140:1, 120:1, 100:1, 90:1, 70:1, 60:1, 50:1, 45:1, 40:1, 35:1, 30:1, 28:1, 26:1, 25:1, 24:1, 22:1, 20:1, 19:1, 18:1, 17:1, 16:1, 15:1, 14:1, 13:1, 25:2, 12:1, 11:1, 10:1, 9:1, 8:1, 7:1, 6:1, 5:1, 4:1, 3:1, or 2:1 by weight of flumazenil to naltrexone. Any ratio of flumazenil and naltrexone can be combined to form a range, provided that the range is within 300:1 and 2:1, such a range of about 30:1 to about 4:1, or about 25:1 to about 10:1.

In some embodiments, the flumazenil is administered to provide a daily dose ranging from about 250 to about 7,500 micrograms. In some embodiments, the flumazenil is administered in an amount to provide a daily dose of about 250; 500; 750; 1,000; 1,250; 1,500; 1,750; 2,000; 2,250; 2,500; 2,750; 3,000; 3,250; 3,500; 3,750; 4,000; 4,250; 4,500; 4,750; 5,000; 5,250; 5,500; 5,750; 6,000; 6,250; 6,500; 6,750; 7,000; 7,250; or 7,500 micrograms. Any minimum and maximum can be combined to form a range provided that the range is within 250 to 7,500 micrograms, such as a range of about 2,000 to about 5,000 micrograms, or about 2,500 to about 4,500 micrograms.

In some embodiments, the naltrexone is administered to provide a daily dose ranging from about 25 to about 1,000 micrograms. In some embodiments, the naltrexone is administered to provide a daily dose of about 25; 50; 75; 100; 125; 150; 175; 200; 225; 250; 275; 300; 325; 350; 375; 400; 425; 450; 475; 500; 550; 600; 650; 700; 750; 800; 850; 900; 950; or 1,000 micrograms. Any minimum and maximum can be combined to form a range provided that the range is within 25 to 1,000 micrograms, such as a range of about 100 to about 600 micrograms, or about 200 to about 400 micrograms.

In some embodiments, the flumazenil is administered to provide a total dose over the course of the treatment ranging from about 4,000 to about 120,000 micrograms. In some embodiments, the flumazenil is administered to provide a total dose of about 4,000; 8,000; 12,000; 16,000; 20,000; 24,000; 28,000; 32,000; 36,000; 40,000; 44,000; 48,000; 52,000; 56,000; 60,000; 64,000; 68,000; 72,000; 76,000; 80,000; 84,000; 88,000; 92,000; 96,000; 100,000; 104,000; 108,000; 112,000; 116,000; or 120,000 micrograms. Any minimum and maximum amount can be combined to form a range provide that the range is within 4,000 to 120,000 micrograms, such as a range of from about 32,000 to about 80,000 micrograms, or from about 40,000 to about 72,000 micrograms.

In some embodiments, the naltrexone is administered to provide a total dose over the course of the treatment ranging from about 400 to about 16,000 micrograms. In some embodiments, the naltrexone is administered to provide a total dose of about 400; 800; 1,200; 1,600; 2,000; 2,400; 2,800; 3,200; 3,600; 4,000; 4,400; 4,800; 5,200; 5,600; 6,000; 6,400; 6,800; 7,200; 7,600; 8,000; 8,800; 9,600; 10,400; 11,200; 12,000; 12,800; 13,600; 14,400; 15,200; or 16,000 micrograms. Any minimum and maximum amount can be combined to form a range provide that the range is within 400 to 16,000 micrograms, such as a range of from about 1,600 to about 9,600 micrograms, or from about 3,200 to about 6,400 micrograms.

The combination of flumazenil and naltrexone may be administered together in a single composition or in separate compositions. Accordingly, in some embodiments, the flumazenil and naltrexone are administered in a single composition, such as the compositions described herein. In other embodiments, the flumazenil and naltrexone are administered simultaneously or sequentially in separate compositions. The composition(s) may be suitably formulated to allow for immediate release, delayed release or slow release of the flumazenil and naltrexone. The composition(s) may be administered so as to achieve bolus delivery, rapid delivery or slow delivery of the composition(s).

The combination of flumazenil and naltrexone may be administered continuously throughout the course of the treatment or intermittently with structured interruptions. Accordingly, in some embodiments, the combination of flumazenil and naltrexone is administered by continuous dosing, where the combination is continuously administered over the course of the treatment. For example, over the course of a 16-day treatment, the combination may be continuously administered over the 16 days. In other embodiments, the combination is administered by interrupted dosing, where the combination is administered with interruptions or breaks between blocks of administration over the course of the treatment. In this context, a "block of administration" or "administration block" refers to a period during which the combination of flumazenil and naltrexone are administered, and an "interruption" refers to a period during which the combination of flumazenil and naltrexone is not administered. For example, over the course of a 22-day treatment, an interrupted dosing may comprise administering the combination for 8 days, not administering the combination for the next 6 days, and administering the combination for the next 8 days (i.e. one 6-day interruption between two 8-day administration blocks). In some embodiments, the interrupted dosing comprises one interruption, two interruptions, three interruptions, four interruptions, five interruptions, or six interruptions, especially one interruption. The duration of each administration block and each interruption may be the same or different, and the frequency of the interruptions may be regular or irregular. Without wishing to be bound by theory, the present inventors hypothesise that interrupted dosing may allow for correction of the neurotransmitter systems of the patient during the interruption periods when flumazenil and naltrexone are not being administered, which may improve treatment outcomes.

The treatment of depression and/or anxiety may be monitored by assessing patients or surveying patients with questionnaires known in the art. The assessments may be completed by researchers, completed by patients, completed by carers or completed by researchers and patients/carers. Suitable assessments include the Hamilton Depression Rating Scale (HAM-D), the Montgomery and Asberg Depression Rating Scale (MADRS), the Beck Anxiety Inventory, the Beck Depression Inventory, the Snaith Hamilton Pleasure Scale, the Social and Occupational Functioning Assessment Scale (SOFAS), the Cheers Scale, the generalised anxiety disorder 7-item rating scale (GAD-7), the Barratt impulsivity scale, checklists for medication, and self-reported rating scales that include functional assessment and/or cover symptoms such as irritability, substance use, fatigue and insomnia, weight loss, lack of interest in sex, and feelings of guilt, hopelessness or fear of being punished.

In other aspects of the present invention, there is provided the use of a combination of flumazenil and naltrexone, or pharmaceutically acceptable salts thereof, for treating depression, wherein the flumazenil and naltrexone are in a ratio of from about 300:1 to about 2:1 by weight. There is also provided the use of a combination of flumazenil and naltrexone, or pharmaceutically acceptable salts thereof, for treating anxiety, wherein the flumazenil and naltrexone are in a ratio of from about 300:1 to about 2:1 by weight.

In other aspects of the present invention, there is provided a combination of flumazenil and naltrexone, or pharmaceutically acceptable salts thereof, for use in the treatment of depression, wherein the flumazenil and naltrexone are in a ratio of from about 300:1 to about 2:1 by weight. There is also provided a combination of flumazenil and naltrexone, or pharmaceutically acceptable salts thereof, for use in the treatment of anxiety, wherein the flumazenil and naltrexone are in a ratio of from about 300:1 to about 2:1 by weight.

In other aspects of the present invention, there is provided the use of flumazenil or a pharmaceutically acceptable salt thereof, in the manufacture of a medicament for the treatment of depression, wherein the medicament is adapted for use in combination with naltrexone or a pharmaceutically acceptable salt thereof and wherein the flumazenil and naltrexone are in a ratio of from about 300:1 to about 2:1 by weight. There is also provided the use of flumazenil or a pharmaceutically acceptable salt thereof, in the manufacture of a medicament for the treatment of anxiety, wherein the medicament is adapted for use in combination with naltrexone or a pharmaceutically acceptable salt thereof and wherein the flumazenil and naltrexone are in a ratio of from about 300:1 to about 2:1 by weight.

In other aspects of the present invention, there is provided the use of naltrexone or a pharmaceutically acceptable salt thereof, in the manufacture of a medicament for the treatment of depression, wherein the medicament is adapted for use in combination with flumazenil or a pharmaceutically acceptable salt thereof and wherein the flumazenil and naltrexone are in a ratio of from about 300:1 to about 2:1 by weight. There is also provided the use of naltrexone or a pharmaceutically acceptable salt thereof, in the manufacture of a medicament for the treatment of anxiety, wherein the medicament is adapted for use in combination with flumazenil or a pharmaceutically acceptable salt thereof and wherein the flumazenil and naltrexone are in a ratio of from about 300:1 to about 2:1 by weight. There is also provided the use of naltrexone or a pharmaceutically acceptable salt thereof, in the manufacture of a medicament for the treatment of PTSD, wherein the medicament is adapted for use in combination with flumazenil or a pharmaceutically acceptable salt thereof and wherein the flumazenil and naltrexone are in a ratio of from about 300:1 to about 2:1 by weight.

In some embodiments, the flumazenil and naltrexone are administered in a single composition, such as the compositions described herein. In other embodiments, the flumazenil and naltrexone are administered simultaneously or sequentially in separate compositions.

EXAMPLES

Example 1—Parenteral Formulation

A formulation of flumazenil and naltrexone for subcutaneous infusion was prepared containing the following components:

| Component | Amount |
|---|---|
| Flumazenil 7.5%/naltrexone hydrochloride 0.6% stock powder | 0.200 g |
| Sodium chloride, USP | 0.04 g |
| Benzyl alcohol (parenteral application), NF | 0.15 mL |
| Sterile water for injection, USP | 25 mL |
| Sterile water for injection, USP | q.s. to 30 mL |
| Hydrochloric acid 10% solution | as required |

The subcutaneous infusion (30 mL solution) contains 15,000 micrograms of flumazenil and 1,200 micrograms of naltrexone hydrochloride. All components were weighed or measured just prior to use.

The flumazenil 7.5%/naltrexone hydrochloride 0.6% stock powder component used in the above formulation was prepared using the following components:

| Component | Amount |
|---|---|
| Flumazenil, USP | 1.500 g |
| Naltrexone hydrochloride, USP | TBD |
| Sodium chloride, USP | TBD |

The formulation may be prepared using the following steps. Sequentially add flumazenil/naltrexone stock powder, sodium chloride and benzyl alcohol to 25 mL sterile water and continuously mix until homogeneous to form a homogenous liquid-like dispersion. Add additional sterile water to the mixture to make up the 30 mL batch size and mix until homogenous to form a homogenous liquid-like dispersion. If the pH is above 4.8, hydrochloric acid solution can be added as required to adjust the pH to between 4.6 and 4.8. Once the pH has been adjusted to between 4.6 and 4.8, a clear homogeneous solution should be obtained. If a clear solution is not achieved, the dispersion can be heated to 45° C. to facilitate dissolution. For storage, the solution can be filtered through a 0.22 μm sterile filter into a suitable dispensing container such as a sterile, tight, light-resistant unit-dose injection vial.

Example 2—Treatment Study

This study is focused on assessing the combination of flumazenil and naltrexone at certain doses and ratios for the treatment of treatment resistant major depressive disorder.

The study involves recruitment of 10 patients presenting as inpatients or outpatients primarily for treatment of treatment resistant major depressive disorder and meeting the required criteria. Inclusion criteria include patients having major depressive disorder exhibiting any symptoms according to DSM-5 diagnostic criteria, and having failed three or more trials of anti-depressant treatments of adequate dose and duration, which can include neurostimulation and/or completed structured psychotherapy. Exclusion criteria include patients who have an active substance abuse disorder, are suffering epilepsy or having a history of seizures or fitting, are pregnant or breastfeeding, are taking ≥5 mg equivalent of diazepam, are under 18 years of age, or are unable or unwilling to provide informed consent.

The treatment regimen for the study is set out below:
Days 0-4: Subcutaneous Infusion 1—15,000 micrograms flumazenil and 1,200 micrograms naltrexone.
Days 5-8: Subcutaneous Infusion 2—15,000 micrograms flumazenil and 1,200 micrograms naltrexone.
Days 8-14: Intermission—no treatment.
Days 14-18—Subcutaneous Infusion 3—15,000 micrograms flumazenil and 1,200 micrograms naltrexone.
Days 18-22: Subcutaneous Infusion 4—15,000 micrograms flumazenil and 1,200 microgram naltrexone.
Participants are also required to take an antiepileptic medication for the first 6 weeks of the study. Treatment for major depressive disorder will also continue as usual for all the participants, and they will be allowed to continue to see their usual treating psychiatrists.

The subcutaneous infusion prepared in Example 1 was used in this study. Therefore, each subcutaneous infusion contains 15,000 micrograms flumazenil and 1,200 micrograms naltrexone and has a total volume of 30 mL and a pH of 4.7. A sterile 25 gauge butterfly needle was inserted into the subcutaneous tissue of the abdomen using a clean technique and was connected to an ambulatory syringe pump to allow for delivery of each 30 mL subcutaneous infusion.

On the initial treatment day (day 0), an Initial Interview was conducted, antiepileptic medication commenced, Infusion 1 commenced, and a blood test ordered for full blood examination, electrolytes and liver function tests, and any other clinically indicated phlebotomy investigations. On day 4, a During Treatment Interview was conducted, Infusion 1 removed, and Infusion 2 commenced. On day 8, a During Treatment Interview was conducted, and Infusion 2 removed. On day 14, a During Treatment Interview was conducted, and Infusion 3 commenced. On day 18, a During Treatment Interview was conducted, Infusion 3 removed, and Infusion 4 commenced. On day 22, a During Treatment Interview was conducted, Infusion 4 removed, and a blood test ordered for full blood examination, electrolytes and liver function tests, and any other clinically indicated phlebotomy investigations. Follow-up interviews were then occur at 6 and 12 weeks, and a Post-Treatment Interview was conducted. Interviews involve the assessments described herein.

The dosage of flumazenil was 15,000 micrograms over each 4-day infusion, equating to 3,750 micrograms per day or 937.5 micrograms per hour. The total dose of flumazenil over the course of the study was 60,000 micrograms. The dosage of naltrexone was 1,200 micrograms over each 4-day infusion, equating to 300 micrograms per day or 12.5 micrograms per hour. The total dose of naltrexone over the course of the study was 4,800 micrograms.

The participants experienced an improvement in symptoms associated with major depressive disorder over the course of the treatment as set out below:

The results of patients are set out below:
Total Score on Beck Anxiety Inventory

| Patient | Day 0 | 6 week follow up | 12 week follow up |
|---|---|---|---|
| Patient 1 | 3 | 5 | 0 |
| Patient 2 | 3 | 5 | 2 |
| Patient 3 | 6 | 8 | — |

Total Score on Beck Depression Inventory

| Patient | Day 0 | 6 week follow up | 12 week follow up |
|---|---|---|---|
| Patient 1 | 17 | 2 | 12 |
| Patient 2 | 23 | 25 | 2 |
| Patient 3 | 15 | 4 | — |

Snaith Hamilton Pleasure Scale

| Patient | 6 week follow up | 12 week follow up |
|---|---|---|
| Patient 1 | 0 | +2 |
| Patient 2 | +2 | −1 |
| Patient 3 | +10 | — |

MADRS Total Score

| Patient | Day 0 | Day 4 | Day 8 | Day 14 | Day 18 | Day 22 | 6 weeks | 12 weeks |
|---|---|---|---|---|---|---|---|---|
| 1 | 31 | 28 | 30 | 35 | 16 | 12 | 7 | 9 |
| 2 | 34 | 29 | 24 | 26 | 27 | 32 | 11 | 8 |
| 3 | 28 | 14 | 16 | 16 | 15 | 15 | 9 | |

Overall SOFAS Score

| Patient | Day 0 | Day 4 | Day 8 | Day 14 | Day 18 | Day 22 | 6 weeks | 12 weeks |
|---|---|---|---|---|---|---|---|---|
| 1 | 35 | 35 | 30 | 30 | 55 | 65 | 75 | 75 |
| 2 | 35 | 45 | 45 | 45 | 45 | 45 | 51 | 51 |
| 3 | 45 | 50 | 50 | 50 | 50 | 50 | 65 | |

The results show an improvement for each patient in their scores of depression and their ability to function in daily life.

Patient 1 continued with symptoms of depression and anxiety until the completion of infusion 3 on Day 18 when a dramatic improvement was noted. The patient observed being less anxious, being able to concentrate on positive thoughts, improved mood and improved concentration. Continued improvement was observed during Infusion 4 and this continued to improve after treatment was completed with a set-back observed after elective surgery and post-operative pain, which resolved by 12 week follow up.

Patient 2 showed improvements in function during Infusion 1, showering for the first time in 2 weeks and having a conversation with a work experience supervisor and colleague, concentration improvements were observed during Infusion 2 and a reduction in depression medication (Quetiapine) from 50 mg to 25 mg without consequence. An adverse event was experienced resulting from a phenytoin interaction with the oral contraceptive pill during the intermission period between day 8 and day 14. During Infusion 4, a back injury occurred and a pet died causing a set-back. An appetite increase was also observed. However, objective improvements were observed in both 6 and 12 week follow up meetings.

Patient 3 showed improvement of function during infusion 1 and was more calm with less morning anxiety from day 2. Longer and more refreshing sleep was observed and more energy over day 3 and day 4. During infusion 2, early improvements were lost or less prominent with broken sleep, occasional agitation, waking early and slightly reduced energy being observed. After the 6 day intermission the patient symptoms remained relatively unchanged with the exception of increased appetite, although no weight gain was observed. Similarly, the patient symptoms remained unchanged during infusion 3 and 4. At the 6 week follow up, the patient had clinically significant continued improvement and observed an partially sustained libido enhancement.

For all patients, improvements in Beck Depression Inventory, MADRS score and overall SOFAS score were observed.

Example 3—Nasal Spray Formulation

A formulation of flumazenil and naltrexone for nasal application was prepared containing the following components:

| Component | Amount |
|---|---|
| Flumazenil USP | 0.208 g |
| naltrexone hydrochloride 1% stock solution | 1.667 mL |
| Carboxymethylcellulose Sodium USP | 0.05 g |
| Sodium chloride, USP | 0.06 g |
| Benzalkonium chloride 1% stock solution | 0.2 mL |
| Sterile water for injection, USP | 7.5 mL |
| Sterile water for injection, USP | q.s. to 10 mL |
| Hydrochloric acid 10% solution | as required |

Naltrexone stock solution was prepared by adding naltrexone hydrochloride to the sterile water for injection (9 mL) and mixing continuously to provide a homogeneous liquid-like solution. Additional sterile water was added to provide the 10 mL solution and mixing continued until all solid particles had completely dissolved.

A Benzalkonium chloride stock solution was prepared by incrementally adding benzalkonium chloride solution (50%) (0.2 mL) to sterile water 9 mL. The composition was mixed to provide a homogeneously liquid-like solution. Additional water was added to make up the volume to 10 mL and stirring continued until all solid particles had completely dissolved.

Flumazenil, sodium chloride and carboxymethylcellulose sodium were combined and triturated to form a fine, homogenous powder blend.

The components in the following order were sequentially added to the sterile water for injection (7.5 mL). Each component was added after the previous one had been completely added and dispersed:
  Naltrexone hydrochloride 1% stock solution (1.667 mL)
  Homogeneous powder blend of flumazenil, sodium chloride and carboxymethylcellulose sodium
  Benzalkonium chloride 1% stock solution (0.2 mL).
The components were continuously mixed until all solid particles had completely dispersed.

A sample of the composition was tested for pH, which should be between 4.6 and 4.8. If the pH was greater than 4.8, hydrochloric acid (10% solution) was added dropwise to the mixture being careful to ensure the pH does not drop below 4.6.

The solution was then made up to 10 mL with sterile water and mixed.

The solution is then transferred into an appropriate dispenser for nasal delivery.

It is to be understood that, if any prior art publication is referred to herein, such reference does not constitute an admission that the publication forms a part of the common general knowledge in the art, in Australia or any other country.

The claims defining the invention are as follows:

1. A pharmaceutical composition comprising flumazenil and naltrexone, or pharmaceutically acceptable salts thereof, wherein the flumazenil and naltrexone are present in a ratio of from about 25:1 to about 10:1 by weight.

2. The pharmaceutical composition of claim 1, wherein the composition is in the form of a single dosage unit.

3. The pharmaceutical composition of claim 2, wherein the single dosage unit is formulated for administration over about 4 days.

4. The pharmaceutical composition of claim 2, wherein the single dosage unit comprises flumazenil in an amount to provide a daily dose ranging from about 250 to about 7,500 micrograms.

5. The pharmaceutical composition of claim 2, wherein the single dosage unit comprises naltrexone in an amount to provide a daily dose ranging from about 25 to about 1,000 micrograms.

6. The pharmaceutical composition of claim 2, wherein the flumazenil is present in the single dosage unit in an amount ranging from about 1,000 to about 30,000 micrograms.

7. The pharmaceutical composition of claim 2, wherein the naltrexone is present in the single dosage unit in an amount ranging from about 100 to about 4,000 micrograms.

8. The pharmaceutical composition of claim 1, wherein the composition is formulated for subcutaneous administration.

9. The pharmaceutical composition of claim 1, wherein the composition is formulated for nasal delivery.

10. A method for treating depression, and/or anxiety, and/or post-traumatic stress disorder, comprising administering to a patient in need thereof a combination of flumazenil and naltrexone, or pharmaceutically acceptable salts thereof, wherein the flumazenil and naltrexone are administered in a ratio ranging from about 25:1 to about 10:1 by weight.

11. The method of claim 10, wherein one or more of the following applies:
   (i) the flumazenil is administered to provide a daily dose ranging from about 250 to about 7,500 micrograms;
   (ii) the naltrexone is administered to provide a daily dose ranging from about 25 to about 1,000 micrograms;
   (iii) the flumazenil is administered to provide a total dose over the course of the treatment ranging from about 4,000 to about 120,000 micrograms; and
   (iv) the naltrexone is administered to provide a total dose over the course of the treatment ranging from about 400 to about 16,000 micrograms.

12. The method of claim 10, wherein the flumazenil and naltrexone are administered in a single composition.

13. The method of claim 10, wherein the combination of flumazenil and naltrexone is administered by continuous dosing.

14. The method of claim 12, wherein the combination of flumazenil and naltrexone is administered by interrupted dosing.

15. A kit comprising one or more pharmaceutical compositions of claim 1, and a delivery device.

* * * * *